(12) United States Patent
Rejman

(10) Patent No.: US 11,365,798 B1
(45) Date of Patent: Jun. 21, 2022

(54) GEAR BAFFLE

(71) Applicant: PRATT & WHITNEY CANADA CORP., Longueuil (CA)

(72) Inventor: Marcin Rejman, Rzeszow (PL)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/124,675

(22) Filed: Dec. 17, 2020

(51) Int. Cl.
  *F16H 57/04* (2010.01)
  *F16H 57/02* (2012.01)
  *F02C 7/36* (2006.01)

(52) U.S. Cl.
  CPC ........... *F16H 57/0423* (2013.01); *F02C 7/36* (2013.01); *F16H 57/02* (2013.01); *F05D 2220/32* (2013.01); *F05D 2260/98* (2013.01); *F16H 57/0457* (2013.01); *F16H 2057/02039* (2013.01)

(58) Field of Classification Search
  CPC .. F16H 57/02; F16H 57/0409; F16H 57/0421; F16H 57/0423; F16H 57/0457; F05D 2220/32; F05D 2260/98; F02C 7/36
  See application file for complete search history.

(56) References Cited

U.S. PATENT DOCUMENTS

| | | | | |
|---|---|---|---|---|
| 6,616,432 | B2 * | 9/2003 | Szczepanski | F04C 2/082 184/11.1 |
| 7,421,921 | B2 * | 9/2008 | Kimura | F16H 57/043 184/1.5 |
| 9,772,026 | B2 * | 9/2017 | Fast | F16H 57/0479 |
| 9,810,311 | B1 * | 11/2017 | Zhang | F16H 57/0457 |
| 10,197,150 | B2 | 2/2019 | Anglin et al. | |
| 10,208,848 | B2 * | 2/2019 | Hotait | F16H 57/0463 |
| 10,267,232 | B2 * | 4/2019 | McCune | F02C 7/06 |
| 11,028,917 | B1 * | 6/2021 | Chapman | F16H 57/0409 |

(Continued)

FOREIGN PATENT DOCUMENTS

| | | | | |
|---|---|---|---|---|
| DE | 102006008821 | A1 * | 8/2007 | ......... F16H 57/0421 |
| JP | 2003329110 | A * | 11/2003 | ......... F16H 57/0421 |
| WO | WO-2015092471 | A * | 6/2015 | ......... F16H 57/0409 |

OTHER PUBLICATIONS

Machine translation of DE 102006008821 A1 obtained on Oct. 20, 2021.*

(Continued)

*Primary Examiner* — Adam D Rogers
(74) *Attorney, Agent, or Firm* — Norton Rose Fulbright Canada LLP

(57) ABSTRACT

A gear baffle, a gearbox of a gas turbine engine including a gear baffle, and a method of installing a gear baffle adjacent to a gear in a gearbox of a gas turbine engine are disclosed. The gearbox includes a housing, having disposed therein a gear, and a baffle adjacent to the gear to interact with lubricant fluid around the gear. The baffle includes a first interface for attaching the baffle to a structure to a first side of the gear, and a second interface for attaching the baffle to a structure to a second, axially opposite, side of the gear. The second interface may be axially spaced apart from the first interface by an axial distance. The baffle may include a main wall interconnecting the first interface with the second interface. The main wall may include a compliant corrugation that accommodates a variation in the axial distance between the first interface and the second interface.

17 Claims, 10 Drawing Sheets

(56) References Cited

U.S. PATENT DOCUMENTS

| | | | |
|---|---|---|---|
| 11,125,316 B2* | 9/2021 | Carmean | F16H 57/0423 |
| 11,143,286 B2* | 10/2021 | Lemmers, Jr | F16H 57/0483 |
| 11,149,837 B2* | 10/2021 | Lemmers, Jr | H02P 9/06 |
| 2014/0260790 A1* | 9/2014 | Passino | F16H 57/0409 |
| | | | 74/606 R |
| 2017/0030457 A1 | 2/2017 | Hotait et al. | |
| 2019/0257406 A1* | 8/2019 | Ichikawa | F16H 57/0452 |

OTHER PUBLICATIONS

Machine translation of JP 2003-329110 A obtained on Oct. 20, 2021.*

* cited by examiner

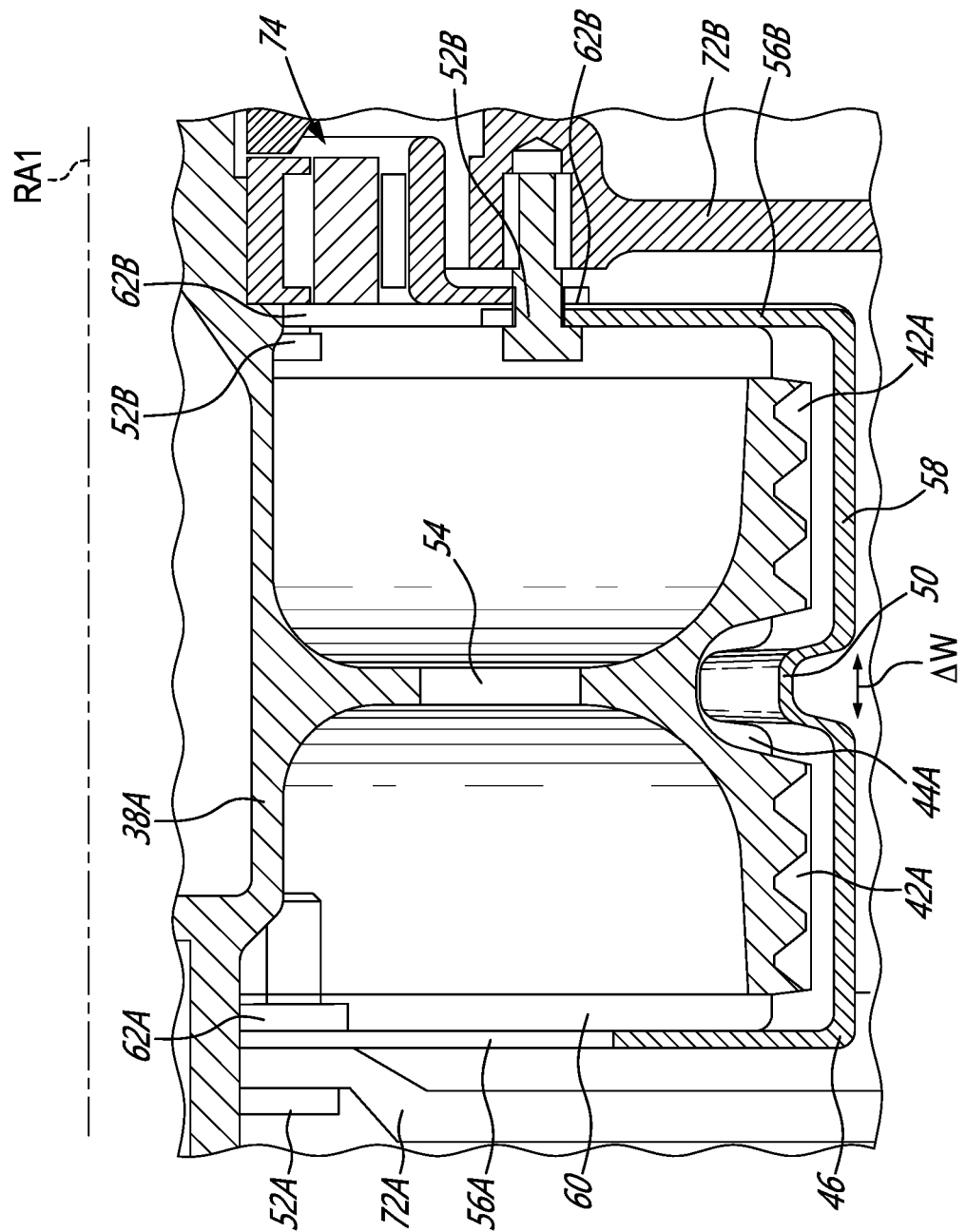

GEAR BAFFLE

TECHNICAL FIELD

The disclosure relates generally to gas turbine engines, and more particularly to gear baffles for interacting with lubricant fluid around gears in gas turbine engines.

BACKGROUND

A gas turbine engine may include a gearbox for coupling one of its spools to a load. The gearbox may include gears which may be partially submerged in, or otherwise interacting with a lubricant fluid. The interaction of the gear(s) with the lubricant fluid can sometimes induce churning of the lubricant fluid. Such churning of the lubricant fluid may be undesirable as it can cause drag-related energy losses and aeration of the lubricant fluid which can reduce the effectiveness of the lubricant fluid.

A gear baffle may be installed adjacent to a gear to mitigate churning of the lubricant fluid caused by the rotation of the gear. However, due to space constraints inside gearboxes of gas turbine engines and dimensional variations in such gearboxes, the design and installation of effective gear baffles in gearboxes of gas turbine engines can be challenging.

SUMMARY

In one aspect, the disclosure describes a gear baffle for interacting with a lubricant fluid around a gear in a gas turbine engine. The gear baffle comprises:

a first interface for attaching the gear baffle to a structure disposed to a first side of the gear;

a second interface for attaching the gear baffle to a structure disposed to a second side of the gear opposite the first side of the gear, the second interface being spaced apart from the first interface by a distance; and a main wall interconnecting the first interface with the second interface, the main wall including a compliant corrugation that accommodates a variation in the distance between the first interface and the second interface.

In another aspect, the disclosure describes a gearbox of a gas turbine engine. The gearbox comprises:

a housing;

a gear disposed inside the housing, the gear being rotatable about an axis;

a baffle disposed inside the housing and adjacent the gear to interact with lubricant fluid around the gear, the baffle including:

a first interface for attaching the baffle relative to the gear, the first interface being disposed to a first side of the gear;

a second interface for attaching the baffle relative to the gear, the second interface being disposed to a second side of the gear axially opposite the first side of the gear relative to the axis, the second interface being axially spaced apart from the first interface by an axial distance; and a main wall interconnecting the first interface with the second interface, the main wall including an axially-compliant corrugation that accommodates a variation in the axial distance between the first interface and the second interface.

In a further aspect, the disclosure describes a method of installing a gear baffle adjacent to a gear in a gearbox of a gas turbine engine where the gear is rotatable about an axis. The method comprises:

attaching a first portion of the gear baffle to a structure disposed to a first side of the gear;

attaching a second portion of the gear baffle to a structure disposed to a second side of the gear, the second portion being axially spaced apart from the first portion by an axial distance relative to the axis; and accommodating a variation in the axial distance between the first portion and the second portion by deforming an axially-compliant corrugation formed into a main wall interconnecting the first and second portions of the gear baffle.

Further details of these and other aspects of the subject matter of this application will be apparent from the detailed description included below and the drawings.

DESCRIPTION OF THE DRAWINGS

Reference is now made to the accompanying drawings, in which:

FIG. 10 is a cross-sectional view of the gear baffle of FIG. 3 with an associated main gear and neighbouring structure taken along line 10-10 in FIG. 3.

DETAILED DESCRIPTION

The following disclosure describes gear baffles, gearboxes including gear baffles, and methods for installing gear baffles. In some embodiments, the gear baffles described herein may mitigate churning of lubricant fluid while also accommodating space constrains and dimensional variations between gearboxes of a same type due in part to tolerance stack-up associated with the assembly of components inside gearboxes. In some embodiments, the baffles described herein may have a compliant (e.g., deformable) feature (e.g., corrugation) that allows (e.g., non-destructive) deformation of part of the baffles to accommodate such dimensional variations in a controlled manner.

The terms "connected", "coupled" and "attached" may include both direct connection/coupling/attachment (in which two elements contact each other) and indirect connection/coupling/attachment (in which at least one additional element is located between the two elements). The terms "substantially" as used herein may be applied to modify any quantitative representation which could permissibly vary without resulting in a change in the basic function to which it is related.

Aspects of various embodiments are described through reference to the drawings.

Figure 1:
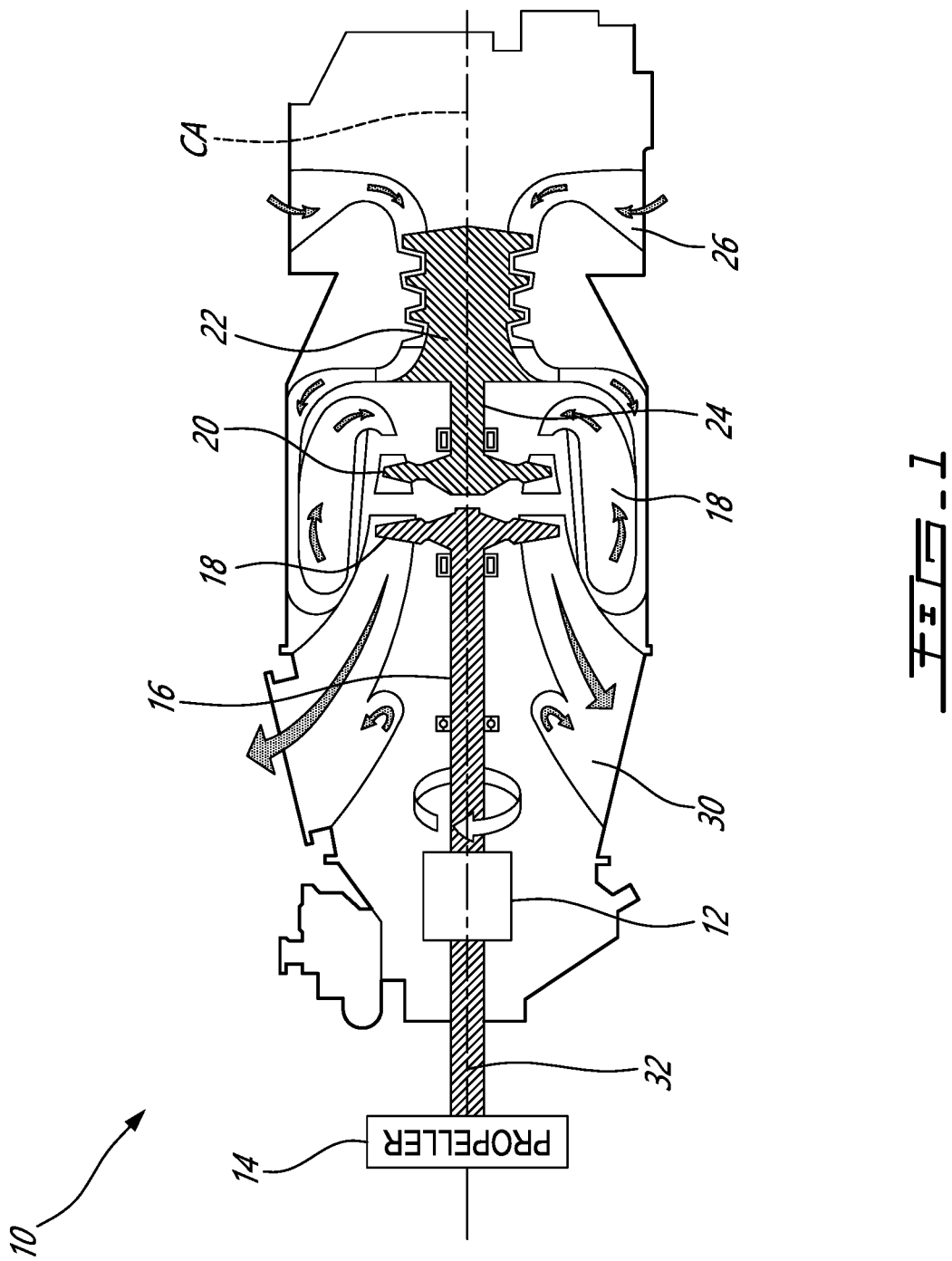
FIG. 1 shows a schematic axial cross-section view of an exemplary turboprop gas turbine engine including a gearbox as described herein.

FIG. 1 is a schematic axial cross-section view of an exemplary reverse flow turboprop gas turbine engine 10 comprising one or more gearboxes 12, as described herein. Even though the following description and FIG. 1 specifically refers to a turboprop gas turbine engine as an example, it is understood that aspects of the present disclosure may be equally applicable to other types of gearboxes and gas turbine engines including turboshaft and turbofan gas turbine engines. Gas turbine engine 10 may be of a type preferably provided for use in subsonic flight to drive a load such as propeller 14 via gearbox 12 coupled to low-pressure shaft 16 (sometimes called "power shaft") further coupled to low-pressure turbine 18.

Compressor 22 may draw ambient air into engine 10 via annular radial air inlet duct 26, increase the pressure of the drawn air and deliver the pressurized air to combustor 28 where the pressurized air is mixed with fuel and ignited for generating an annular stream of hot combustion gas. High-pressure turbine 20 may extract energy from the hot expanding combustion gas and thereby drive compressor 22. The hot combustion gas leaving high-pressure turbine 20 may be accelerated as it further expands, flows through and drives low pressure turbine 18. The combustion gas may then exit gas turbine engine 10 via exhaust duct 30.

Low-pressure shaft 16 may be drivingly coupled to propeller 14 or another load via gearbox 12 and propeller shaft 32. Gearbox 12 may be of a speed-reducing type so that the rotation speed of propeller shaft 32 may be lower than that of low-pressure shaft 16. Engine 10 may have central axis CA, which may correspond to an axis of rotation of one or more spools of engine 10. For example, central axis CA may correspond to an axis of rotation of low-pressure shaft 16. In various embodiments, central axis CA may correspond to an axis of rotation of propeller shaft 32, or propeller shaft 32 may rotate about an axis that is offset from central axis CA.

Figure 2:
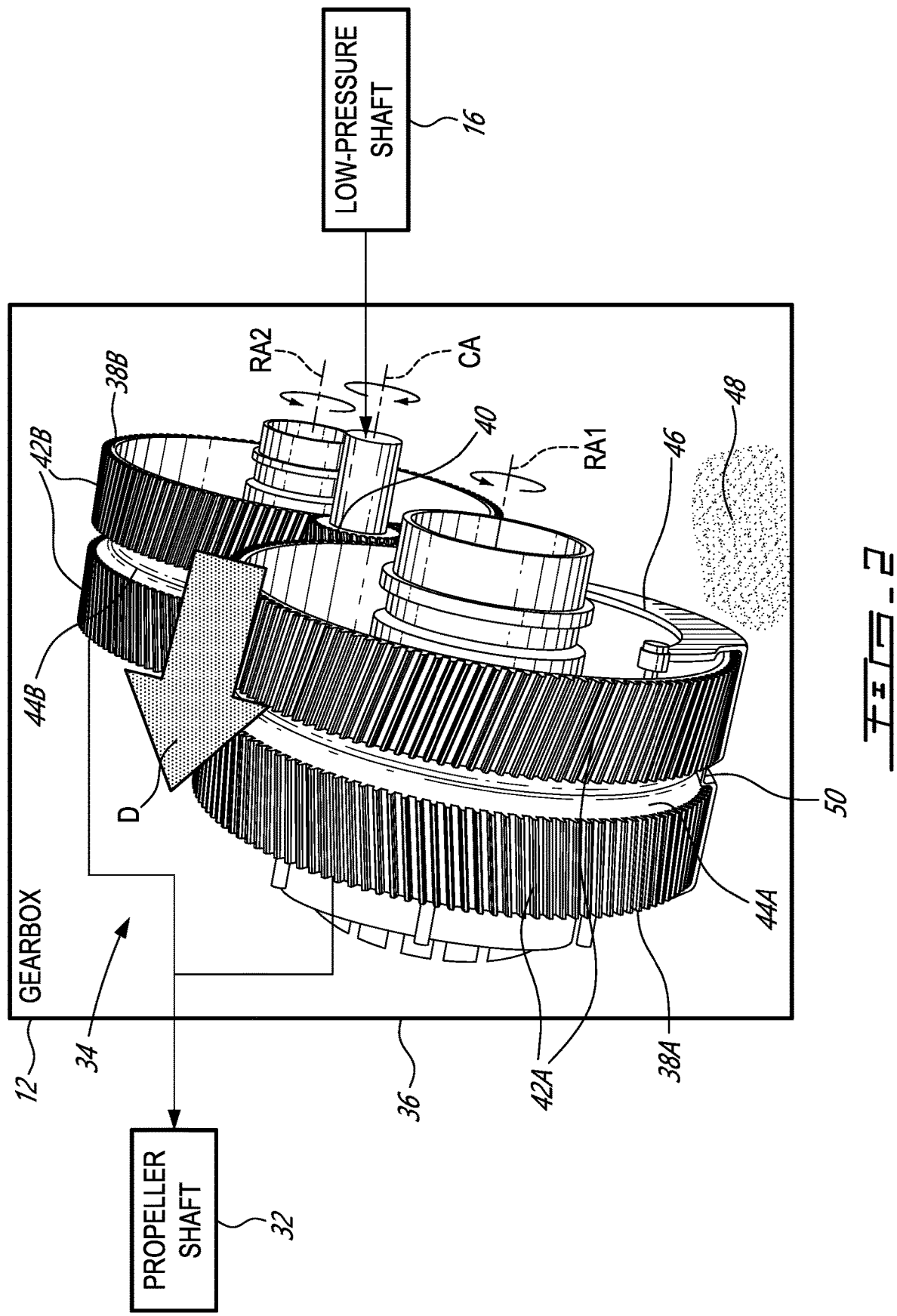
FIG. 2 is a perspective schematic view of part of an exemplary gearbox of the engine of FIG. 1 including a gear baffle.

FIG. 2 shows a perspective view of an exemplary gear set 34 that may be part of gearbox 12 and that may be disposed inside housing 36 (shown schematically) of gearbox 12. Gear set 34 may be only a subset of gears that are part of gearbox 12. Gear set 34 may include main gears 38A, 38B and input gear 40 drivingly coupled to (i.e., meshed with) both main gears 38A, 38B. Input gear 40 may be coupled to low-pressure shaft 16 and receive an input torque from low-pressure shaft 16. Input gear 40 may drive main gears 38A, 38B, which may be drivingly coupled to propeller shaft 32 via other gears that are not shown in FIG. 2. The relative sizes of input gear 40 and of main gears 38A, 38B may provide a rotational speed reduction.

In various embodiments, input gear 40 may be rotatable about central axis CA of engine 10 or about an axis other than central axis CA. Main gears 38A, 38B may be rotatable about respective rotation axes RA1 and RA2. Axes RA1 and RA2 may be substantially parallel to central axis CA. When being installed in housing 36, main gears 38A, 38B and input gear 40 may be inserted as a preassemble unit into housing 36 along arrow D. The preassembled unit may include baffle 46 positioned adjacent to main gear 38A, and optionally another gear baffle may be positioned adjacent to main gear 38B.

In some embodiments, main gears 38A, 38B may each be a double gear having two toothed faces 42A, 42B. For example, main gears 38A, 38B may be double helical gears. For example, main gear 38A may have two toothed faces 42A that are axially spaced apart and separated by axial gap 44A. Main gear 38B may also have two toothed faces 42B that are axially spaced apart and separated by axial gap 44B. Axial gaps 44A, 44B may be defined by respective circumferential grooves extending around respective axes RA1, RA2 and that are radially-outwardly open. Input gear 40 may also have two axially spaced apart toothed faces for meshing with counterpart toothed faces 42A and 42B of main gears 38A, 38B.

FIG. 2 shows a single baffle 46 being installed adjacent to main gear 38A for interacting with a liquid lubricant fluid 48 (e.g., oil) around main gear 38A. The geometric configuration of baffle 46 may define a receptacle for receiving a lower portion of main gear 38A that may be submerged in lubricant fluid 48. Baffle 46 may also include corrugation 50 that may optionally extend radially-inwardly between toothed faces 42A and into axial gap 44A. It is understood that another baffle could also be installed adjacent to main gear 38B. Baffle 46 may be used in conjunction with other gear types such as spur gears and/or with single gears having only one toothed face instead of two. Baffle 46 may be used in various types of gear sets including speed-reducing and speed-augmenting types of gear sets.

Figure 3:
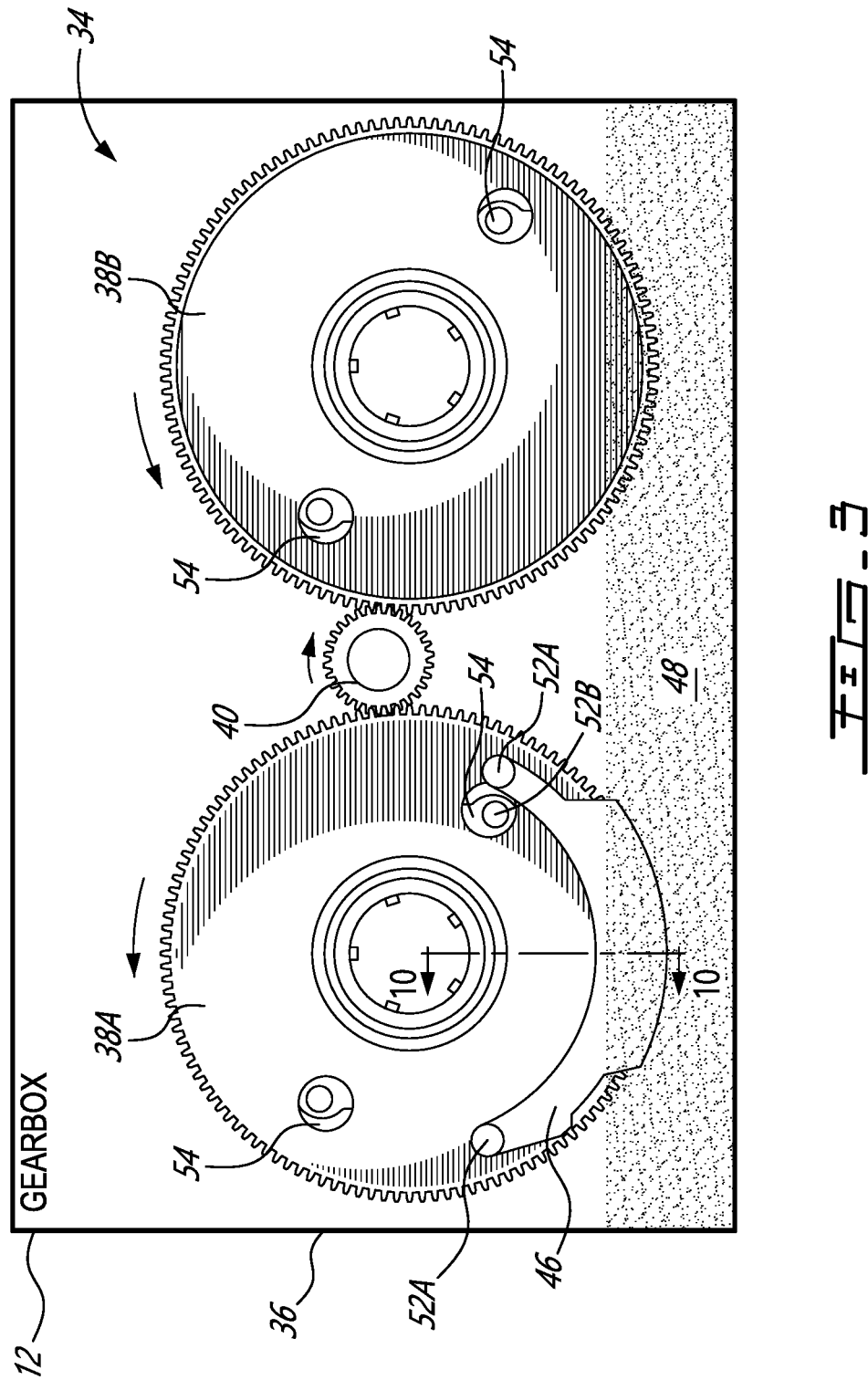
FIG. 3 is a schematic front view of the part of the gearbox of FIG. 2.

FIG. 3 is a front plan view of an interior of gearbox 12 showing gear set 34 of FIG. 2. Gear baffle 46 may be attached to fixed structure within gearbox 12 so that baffle 46 may be stationary relative to rotating gear 38A. A first side of baffle 46 disposed to a first side of main gear 38A may be attached via one or more first fasteners 52A (e.g., bolts, machine screws). A second side of baffle 46 disposed to an axially opposite second side of main gear 38A may be attached via one or more second fasteners 52B (e.g., bolts, machine screws). First and second fasteners 52A, 52B may be accessible from a same side of main gear 38A. For example, second fasteners 52B may be accessible via one or more through passages 54 formed in a web of main gear 38A. Through passages 54 may be positioned and sized allow for a tool such as socket or other driver access to second fasteners 52B from the side of main gear 38A shown in FIG. 2. Through passages 54 may be aligned with second fastener(s) 52B by manually rotating main gear 38A during installation or removal of baffle 46.

Figure 4:
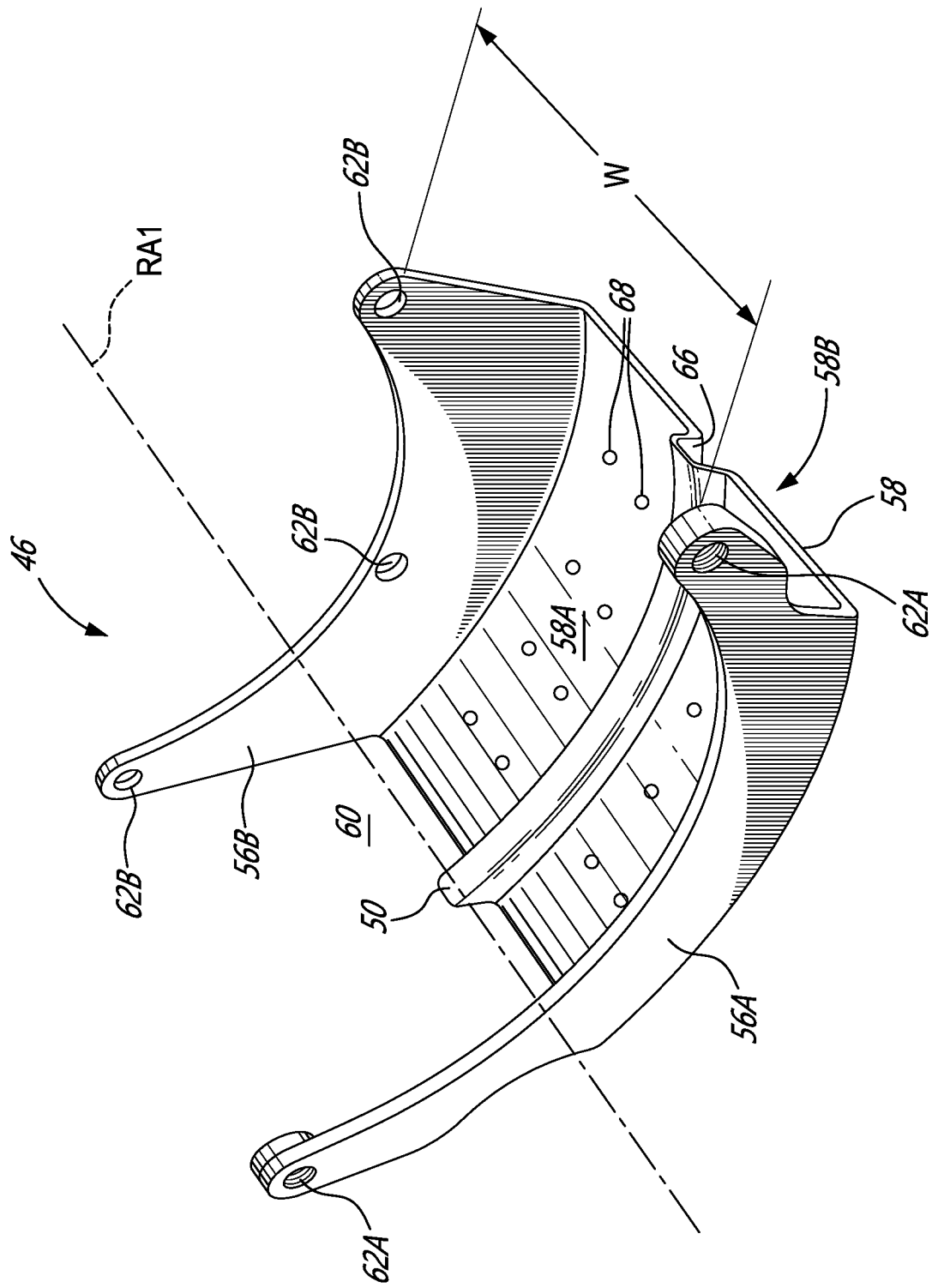
FIGS. 4-6 are perspective views of an exemplary gear baffle for the gearbox of FIGS. 2 and 3.
Figure 5:
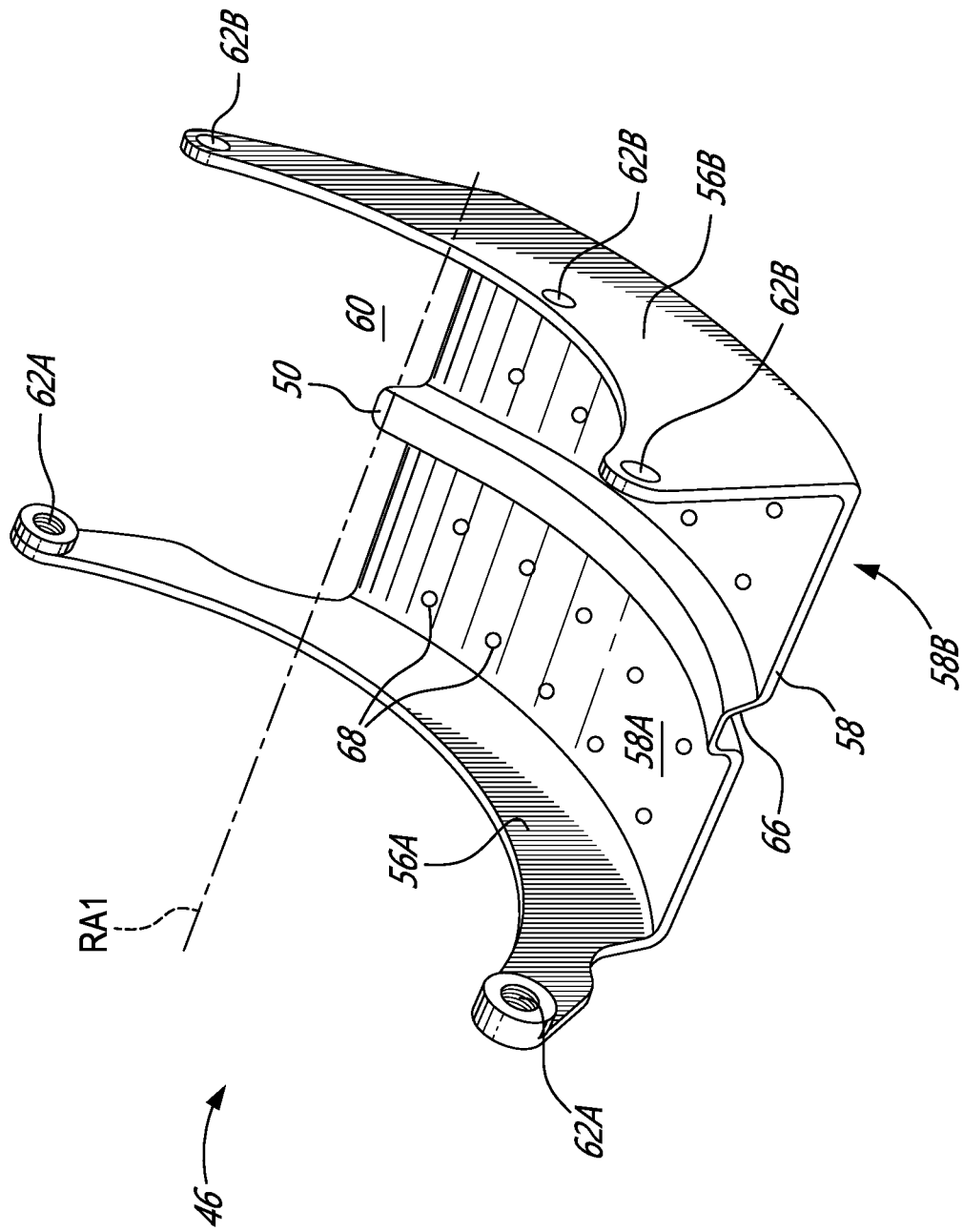
Figure 6:
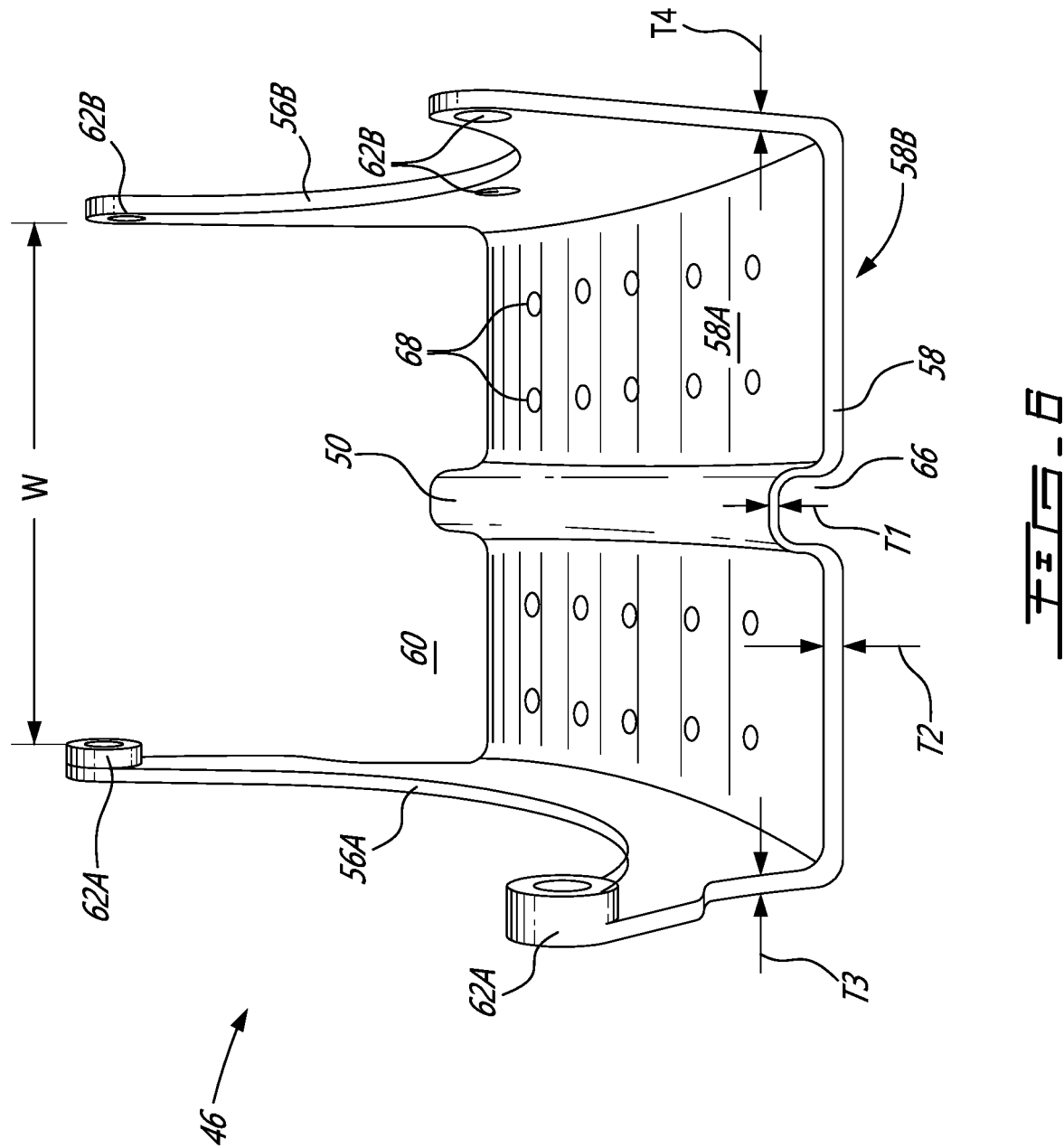

FIGS. 4 to 6 are perspective views of baffle 46. In reference to FIGS. 4 and 5, baffle 46 may include first sidewall 56A and second sidewall 56B attached to main wall 58. First and second sidewalls 56A, 56B may be axially spaced apart by axial distance W. Main wall 58 may axially interconnect first and second sidewalls 56A, 56B. Main wall 58 may be disposed radially outward of main gear 38A. A gap may be provided between main gear 38A and main wall 58, and also between main gear 38A and sidewalls 56A, 56B to allow the presence and flow of lubricant fluid 48 between gear faces 42A and baffle 46. First and second sidewalls 56A, 56B may extend radially-inwardly from main wall 58 relative to rotation axis RA1 of main gear 38A. When installed, first sidewall 56A may be disposed to the first axial side of main gear 38A and second sidewall 56B may be disposed to the opposite second axial side of main gear 38A. In other words, baffle 46 may define receptacle 60 in which part of main gear 38A may be received during use.

First sidewall 56A may include one or more first interfaces 62A disposed thereon to permit the attachment of baffle 46 to a structure within gearbox 12 to one axial side of main gear 38A. Second sidewall 62B may include one or more second interfaces 62B disposed thereon to permit the attachment of baffle 46 to a structure within gearbox 12 to another axially opposite side of main gear 38A. First interfaces 62A may each include a through threaded hole for engagement with a threaded first fastener 52A shown in FIG. 3. Such threaded holes may be drilled and tapped in first sidewall 56A. In some embodiments, first interfaces 62A may each include a self-locking helical coil (i.e., threaded) insert. Second interfaces 62B may each include a through unthreaded hole for receiving therethrough a threaded second fastener 52B shown in FIG. 3. In some embodiments, the threaded holes of first interfaces 62A and the unthreaded holes of second interfaces 62B may be oriented to be substantially parallel to rotation axis RA1.

First sidewall 56A and second sidewall 56B may be relatively rigid and substantially planar. Baffle 46 may be made from a suitable metallic material such as (e.g., stainless) steel. In some embodiments, baffle 46 may be made from stamped sheet metal. First sidewall 56A and second sidewall 56B may be interconnected by main wall 58. Main wall 58 may include corrugation 50 (e.g., wrinkle, fold, furrow, ridge) that may accommodate a dimensional variation in axial distance W between first interface(s) 62A and second interface(s) 62B. Corrugation 50 may be compliant (e.g., deformable) and may relatively easily absorb some dimensional variation to facilitate installation of baffle 46. Corrugation 50 may compensate for dimensional variations caused by dimensional tolerance stack-up associated with the structure(s) to which baffle 46 is attached. In some embodiments, corrugation 50 may permit axial distance W to be extended and/or shortened within prescribed amounts by the extension and/or compression of corrugation 50. Corrugation 50 may be (e.g., resiliently and/or plastically) deformable in a non-destructive manner.

First sidewall 56A and second sidewall 56B may be transverse (e.g., substantially perpendicular) to main wall 58 and substantially parallel to one another so that baffle 46 may define a substantially U-shaped receptacle 60. Nominal axial dimension W of baffle 46 (i.e., before deformation of corrugation 50) may be determined based on an expected axial gear width of main gear 38A and an expected axial distance between structure(s) to which first and second sidewalls 56A, 56B of baffle 46 will be attached.

Main wall 58 may include radially-inner side 58A (surface) facing main gear 38A, and a radially-outer side 58B (surface) opposite radially-inner side 58A. Main wall 58 may have a curved (e.g., arcuate) shape extending partially around axis RA1. In some embodiments, corrugation 50 may define a ridge extending (e.g., radially-inwardly) from radially-inner side 58A of main wall 58. In some embodiments, corrugation 50 may define groove 66 on radially-outer side 58B of main wall 58. In some embodiments, corrugation 50 may extend in a circumferential direction relative to rotation axis RA1 of main gear 38A. Corrugation 50 may extend the full arcuate/circumferential length of main wall 58. In some embodiments, corrugation 50 may also provide added stiffness to main wall 58.

In some embodiments, corrugation 50 may be disposed substantially axially midway (e.g., at or close to W/2) between first interface 62A and second interface 62B. In some embodiments, corrugation 50 may be disposed to be axially coincident with axial gap 44A (shown in FIG. 2) of main gear 38A so that corrugation 50 may extend radially into and occupy part of axial gap 44A during operation. In some embodiments, main wall 58 may be perforated to permit the flow of lubricant fluid 48 therethrough. Accordingly, main wall 58 may have one or more perforations 68 of circular or other cross-sectional shapes.

In some embodiments, main wall 58 may have two or more corrugations 50. In some embodiments, main wall 58 may have one or more corrugations that define one or more ridges extending (e.g., radially-outwardly) from radially-outer side 58B of main wall 58 for example. In various embodiments, an axial cross-sectional profile of corrugation 50 in a plane parallel to rotation axis RA1 may be of any suitable shape such as sinusoidal, trapezoidal or saw tooth shape for example.

In reference to FIG. 6, baffle 46 may be integrally formed (e.g., stamped) from a piece of sheet metal of uniform thickness as a single piece having a unitary construction. For example, as shown in FIG. 6, a portion of main wall 58 at corrugation 50 may have a wall thickness T1, and a portion of main wall 58 outside of corrugation 50 may have a wall thickness T2. In some embodiments, wall thickness T1 may be smaller than wall thickness T2. First and second side walls 56A, 56B may have respective wall thicknesses T3 and T4. In some embodiments, wall thicknesses T3 and T4 may be substantially equal. In some embodiments, wall thicknesses T3 and T4 may be substantially equal to wall thickness T2 of main wall 58. In some embodiments wall thickness T1 may be smaller than wall thicknesses T2, T3 and T4. The smaller wall thickness T1 and/or shape of corrugation 50 may encourage axial deformation of baffle 46 to be absorbed by corrugation 50 as opposed to other parts of baffle 46. In other words, corrugation 50 may provide control over the axial deformation of baffle 46. Such control over the deformation of baffle 46 may also help maintain clearances between baffle 46 and main gear 38A, and/or between baffle 46 and other components of gearbox 12 despite dimensional variations.

Figure 7:
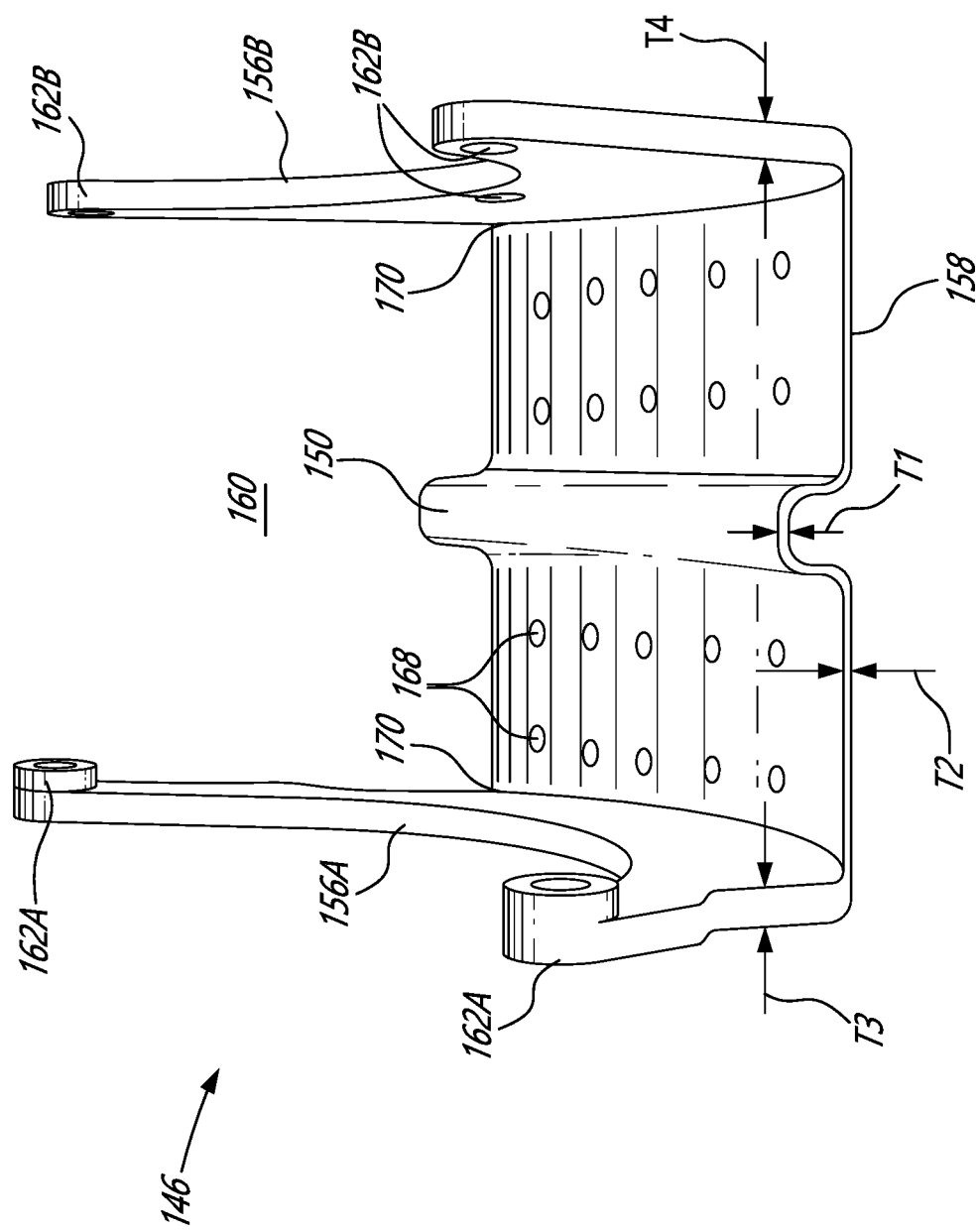
FIG. 7 is a perspective front view of another exemplary gear baffle for the gearbox of FIGS. 2 and 3.

FIG. 7 is a perspective front view of another exemplary gear baffle 146 for use in gearbox 12. Baffle 146 may have elements in common with baffle 46 already described above. Like elements have been identified using reference numerals incremented by 100. Baffle 146 may include main wall 158 with corrugation 150 and perforations 168, first sidewall 156A with one or more first interfaces 162A, and second sidewall 156B with one or more second interfaces 162B. Baffle 146 may define receptacle 160 for receiving part of main gear 38A.

Baffle 146 may be made from separate pieces that are subsequently attached together. For example, sidewalls 156A, 156B and main wall 158 may be made separately by any suitable metal fabrication method(s) including machining and/or sheet metal forming method(s), and then welded together at welded junctions 170 for example.

In some embodiments, wall thickness T1 of main wall 158 at corrugation 150 may be substantially equal to or smaller than wall thickness T2 of main wall 158 outside of corrugation 150. In some embodiments, wall thicknesses T3 and T4 of first and second sidewalls 156A, 156B may be substantially equal. In some embodiments, wall thicknesses T3 and T4 may be greater than wall thicknesses T1 and T2 of main wall 158. The smaller wall thickness T1 and/or shape of corrugation 150 may encourage axial deformation of baffle 46 to be absorbed by corrugation 150 as opposed to bending of sidewalls 156A, 156B for example.

Figure 8:
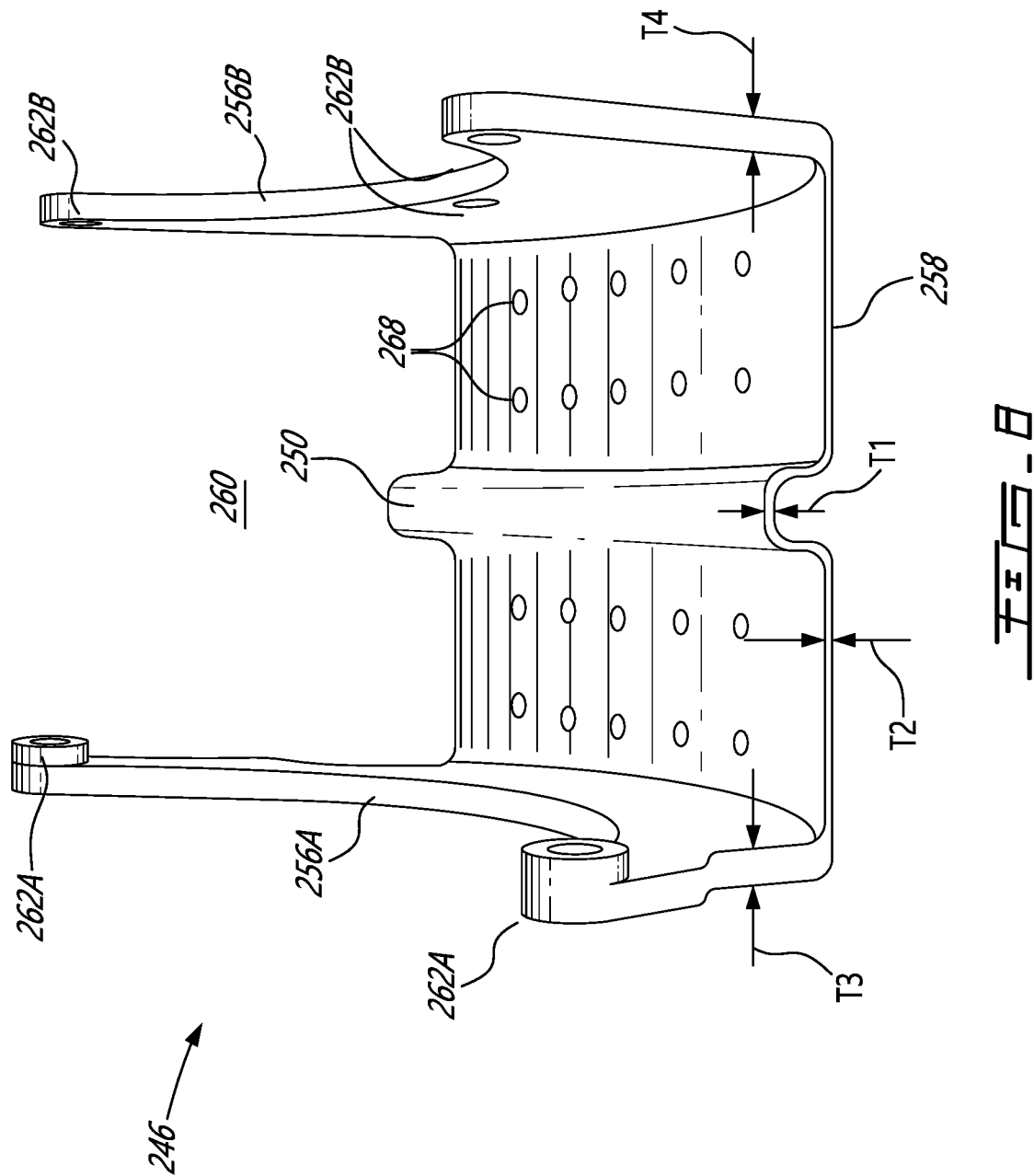
FIG. 8 is a perspective front view of another exemplary gear baffle for the gearbox of FIGS. 2 and 3.

FIG. 8 is a perspective front view of another exemplary gear baffle 246 for use in gearbox 12. Baffle 246 may have elements in common with baffle 46 already described above. Like elements have been identified using reference numerals incremented by 200. Baffle 246 may include main wall 256 with corrugation 250 and perforations 268, first sidewall 256A with one or more first interfaces 262A, and second sidewall 256B with one or more second interfaces 262B. Baffle 246 may define receptacle 260 for receiving part of main gear 38A.

Baffle 246 may be machined (e.g., using a ball end mill) as a single piece having a unitary construction from a block of metallic material. In some embodiments, wall thickness T1 of main wall 258 at corrugation 250 may be substantially equal to or smaller than wall thickness T2 of main wall 258 outside of corrugation 250. In some embodiments, wall thicknesses T3 and T4 of first and second sidewalls 256A, 256B may be substantially equal. In some embodiments, wall thicknesses T3 and T4 may be greater than wall thicknesses T1 and T2 of main wall 258. The smaller wall thickness T1 and/or shape of corrugation 250 may encourage axial deformation of baffle 246 to be absorbed by corrugation 250 as opposed to bending of sidewalls 156A, 156B for example.

Figure 9:
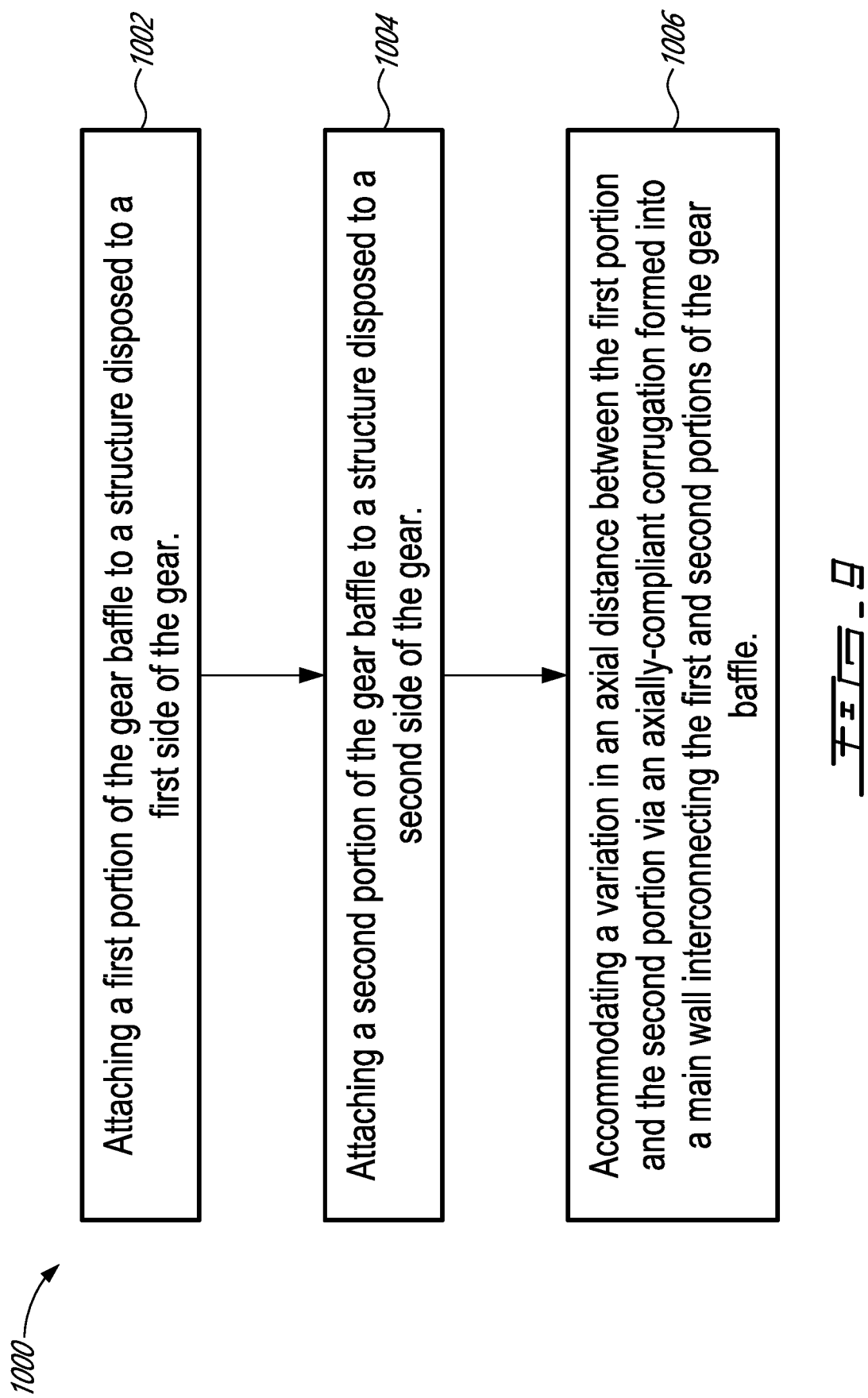
FIG. 9 is a flowchart of an exemplary method of installing a gear baffle.

FIG. 9 is a flowchart of an exemplary method 1000 of installing a gear baffle adjacent to a gear in a gearbox of a gas turbine engine. Method 1000 may be performed using any of gear baffles 46, 146 or 246 in gearbox 12 described herein, or with other baffles and gearboxes. It is understood that aspects of method 1000 may be combined with other aspects or steps described herein. Method 1000 may include:

attaching a first portion (e.g., first sidewall 56A) of baffle 46 to a structure disposed to a first side of main gear 38A (block 1002);

attaching a second portion (e.g., second sidewall 56B) of baffle 46 to a structure disposed to a second side of main gear 38A, the second portion being axially spaced apart from the first portion by axial distance W relative to rotation axis RA1 of main gear 38A (block 1004); and accommodating a variation in the axial distance W between the first portion and the second portion by deforming axially-compliant corrugation 50 formed into main wall 58 interconnecting the first and second portions of baffle 46 (block 1006).

FIG. 10 is a cross sectional view of baffle 46 and main gear 38A with neighbouring components taken along line 10-10 in FIG. 3. Aspects of method 1000 are further described below in relation to FIG. 10. Second sidewall 56B of baffle 46 may be attached to second structure 72B via fastener(s) 52B extending through second sidewall 56B at respective second interface(s) 62B. Fasteners 52B may be threadably engaged with threaded holes formed in second structure 72B. Fasteners 52B may be driven into second structure 72B using a suitable tool extended through passage 54.

Second structure 72B may be any suitable structural element stationary relative to main gear 38A. In some embodiments, second structure 72B may be attached to or part (e.g., wall, web, boss, cover) of housing 36 of gearbox 12. In some embodiments, main gear 38A may be rotatably supported by second structure 72B via one or more bearings 74.

First sidewall 56A of baffle 46 may be attached to first structure 72A via fastener(s) 52A extending through first sidewall 56A at respective first interface(s) 62A. Fasteners 52A may extend through a (e.g., unthreaded) hole formed in first structure 72A and be threadably engaged with threaded holes formed in first sidewall 56A at respective first interfaces 62A. Fasteners 52A may be driven into first side wall 56A using a suitable tool. Fasteners 52A and 52B may be driven in the same direction and from a same axial side of main gear 38A.

First structure 72A may be any suitable structural element stationary relative to main gear 38A. In some embodiments, first structure 72A may be attached to or part (e.g., wall, web, boss, removable cover) of housing 36 of gearbox 12.

When baffle 46 is installed adjacent of main gear 38A, a lower portion of main gear 36A may be received in receptacle 60 defined by baffle 46. Corrugation 50 may be axially positioned to be in axial alignment with axial gap 44A of main gear 38A. Corrugation 50 may also extend radially-inwardly and be inserted into axial gap 44A to provide an efficient use of space within gearbox 12 and also provide a beneficial interaction with the lubricant fluid 48.

In various embodiments, the installation of baffle 46 may include attaching second sidewall 56B to second structure 72B using second fasteners 52B before or after attaching first sidewall 56A to first structure 72A using first fasteners 52A. As an example, in situations where baffle 46 is slightly axially undersized compared to the axial distance between first and second structures 72A, 72B, the tightening of first fasteners 52A after second fasteners 52B have already been tightened may apply an axial tension force into baffle 46 and cause an axial extension of baffle 46. The axial extension is illustrated by arrow ΔW in FIG. 10 and may be accommodated by an axial deformation/extension of corrugation 50 of main wall 58. On the other hand, in situations where baffle 46 is slightly axially oversized compared to the axial distance between first and second structures 72A, 72B, the positioning of baffle 46 between first and second structures 72A, 72B may require manual axial shortening/compression of baffle 46. The axial shortening/compression may be accommodated by an axial deformation/compression of corrugation 50. In other words, corrugation 50 may permit baffle 46 to be axially self-adjusting to dimensional variations in gearboxes.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

What is claimed is:

1. A gear baffle for interacting with a lubricant fluid around a gear in a gas turbine engine, the gear baffle comprising:
    a first interface for attaching the gear baffle to a structure disposed to a first side of the gear;
    a second interface for attaching the gear baffle to a structure disposed to a second side of the gear opposite the first side of the gear, the second interface being spaced apart from the first interface by a distance; and
    a main wall interconnecting the first interface with the second interface, the main wall including a corrugation that is deformable to allow the main wall to accommodate a variation in the distance between the first interface and the second interface;
    wherein:
    the first interface is disposed on a first sidewall attached to the main wall; and
    a thickness of the first sidewall is greater than a thickness of the main wall at a location of the corrugation.

2. The gear baffle of claim 1, wherein:
    the main wall has an inner side for facing the gear; and
    the corrugation defines a ridge on the inner side of the main wall.

3. The gear baffle of claim 2, wherein:
    the main wall has an outer side opposite the inner side; and
    the corrugation defines a groove on the outer side of the main wall.

4. The gear baffle of claim 1, wherein the corrugation is disposed substantially midway between the first interface and the second interface.

5. The gear baffle of claim 1, wherein:
    the second interface is disposed on a second sidewall attached to the main wall; and a thickness of the second sidewall is greater than the thickness of the main wall at the location of the corrugation.

6. The gear baffle of claim 1, wherein the main wall is perforated.

7. The gear baffle of claim 1, wherein the first interface includes a threaded through hole.

8. The gear baffle of claim 7, wherein:
the second interface includes an unthreaded through hole; and
the threaded and unthreaded through holes are substantially parallel.

9. A gearbox of a gas turbine engine, the gearbox comprising:
a housing;
a gear disposed inside the housing, the gear being rotatable about an axis;
a baffle disposed inside the housing and adjacent the gear to interact with lubricant fluid around the gear, the baffle including:
a first interface for attaching the baffle relative to the gear, the first interface being disposed to a first side of the gear;
a second interface for attaching the baffle relative to the gear, the second interface being disposed to a second side of the gear axially opposite the first side of the gear relative to the axis, the second interface being axially spaced apart from the first interface by an axial distance; and
a main wall interconnecting the first interface with the second interface, the main wall including an axially-deformable corrugation that allows the main wall to accommodate a variation in the axial distance between the first interface and the second interface; wherein:
the first interface is disposed on a first sidewall of the baffle attached to the main wall;
the second interface is disposed on a second sidewall of the baffle attached to the main wall;
the main wall, the first sidewall and the second sidewall cooperatively define a receptacle for receiving part of the gear therein;
the main wall has a radially-inner side facing the gear;
the corrugation defines a ridge on the radially-inner side of the main wall;
the gear has two gear faces axially separated by an axial gap; and
the ridge extends radially into the axial gap between the two gear faces.

10. The gearbox of claim 9, wherein:
the main wall has a radially-outer side opposite the radially-inner side; and
the corrugation defines a groove on the radially-outer side of the main wall.

11. The gearbox of claim 9, wherein a thickness of the first sidewall is greater than a thickness of the main wall at a location of the corrugation.

12. The gearbox of claim 9, wherein:
the first interface is one of two first interfaces disposed to the first side of the gear for attaching the baffle relative to the gear; and
the second interface is one of two second interfaces disposed to the second side of the gear for attaching the baffle relative to the gear.

13. The gearbox of claim 9, wherein:
the first sidewall is oriented transversely to the main wall;
the first interface includes a threaded hole extending through the first sidewall;
the second sidewall is oriented transversely to the main wall; and
the second interface includes an unthreaded hole extending through the second sidewall, the threaded and unthreaded holes being substantially parallel.

14. A method of installing a gear baffle adjacent to a gear in a gearbox of a gas turbine engine, the gear being rotatable about an axis, the method comprising:
attaching a first portion of the gear baffle to a structure disposed to a first side of the gear;
attaching a second portion of the gear baffle to a structure disposed to a second side of the gear, the second portion being axially spaced apart from the first portion by an axial distance relative to the axis; and
causing a main wall interconnecting the first portion and the second portion of the gear baffle to accommodate a variation in the axial distance between the first portion and the second portion by deforming an axially-deformable corrugation formed into the main wall.

15. The method of claim 14, wherein:
the gear has two gear faces that are axially separated by an axial gap relative to the axis;
the corrugation defines a ridge on the main wall; and
the method includes inserting the ridge into the axial gap.

16. The method of claim 14, comprising receiving part of the gear into a receptacle defined by the gear baffle.

17. The method of claim 14, comprising axially extending the corrugation when attaching the second portion of the gear baffle to the structure disposed to the second side of the gear.

* * * * *